US011915680B2

(12) United States Patent
Li et al.

(10) Patent No.: US 11,915,680 B2
(45) Date of Patent: Feb. 27, 2024

(54) METHOD AND SYSTEM FOR ACTIVE NOISE CONTROL

(71) Applicant: SHENZHEN GOODIX TECHNOLOGY CO., LTD., Guangdong (CN)

(72) Inventors: Guoliang Li, Guangdong (CN); Lelin Wang, Guangdong (CN); Wenkai Han, Guangdong (CN); Hongjing Guo, Guangdong (CN)

(73) Assignee: SHENZHEN GOODIX TECHNOLOGY CO., LTD., Guangdong (CN)

( * ) Notice: Subject to any disclaimer, the term of this patent is extended or adjusted under 35 U.S.C. 154(b) by 151 days.

(21) Appl. No.: 17/694,770

(22) Filed: Mar. 15, 2022

(65) Prior Publication Data

US 2022/0208169 A1 Jun. 30, 2022

Related U.S. Application Data

(63) Continuation of application No. PCT/CN2020/081161, filed on Mar. 25, 2020.

(51) Int. Cl.
*G10K 11/178* (2006.01)
*H04R 1/10* (2006.01)

(52) U.S. Cl.
CPC .................. *G10K 11/17854* (2018.01); *G10K 11/17823* (2018.01); *G10K 11/17853* (2018.01); *G10K 11/17873* (2018.01); *H04R 1/1083* (2013.01); *G10K 2210/1081* (2013.01); *G10K 2210/3012* (2013.01); *G10K 2210/3025* (2013.01);

(Continued)

(58) Field of Classification Search
CPC .............. H04R 1/1083; H04R 2460/01; G10K 2210/1081; G10K 11/17854; G10K 2210/3012; G10K 2210/3028; G10K 2210/3222
See application file for complete search history.

(56) References Cited

U.S. PATENT DOCUMENTS

| | | | |
|---|---|---|---|
| 5,412,735 | A | 5/1995 | Engebretson et al. |
| 9,100,756 | B2 | 8/2015 | Dusan et al. |

(Continued)

FOREIGN PATENT DOCUMENTS

| | | | |
|---|---|---|---|
| CN | 104081789 | A | 10/2014 |
| CN | 105376668 | A | 3/2016 |

(Continued)

OTHER PUBLICATIONS

Machine translation of CN107277669A, 17 pages. (Year: 2017).*
International Search Report dated Dec. 30, 2020 issued in PCT/CN2020/081161.

*Primary Examiner* — Ping Lee
(74) *Attorney, Agent, or Firm* — Scully, Scott, Murphy & Presser, P.C.

(57) ABSTRACT

Embodiments of the present application provide a method and system for active noise control, which can meet different needs of different consumers on sound quality of headphones. The method includes: determining an expected noise control curve of performing active noise control on a target object; determining a target filter according to the expected noise control curve and a filter model; and performing noise control processing on an external noise signal using the target filter.

18 Claims, 4 Drawing Sheets

(52) U.S. Cl.
CPC ................ *G10K 2210/3027* (2013.01); *G10K 2210/3028* (2013.01); *G10K 2210/3056* (2013.01); *G10K 2210/3222* (2013.01); *H04R 2460/01* (2013.01)

(56) References Cited

U.S. PATENT DOCUMENTS

| | | | | |
|---|---|---|---|---|
| 10,667,047 | B2 | 5/2020 | Asada et al. | |
| 2013/0329895 | A1 | 12/2013 | Dusan et al. | |
| 2014/0126734 | A1* | 5/2014 | Gauger, Jr. ...... | G10K 11/17853 381/71.6 |
| 2014/0314245 | A1 | 10/2014 | Asada et al. | |
| 2015/0271439 | A1* | 9/2015 | Okano ................ | G10K 11/178 381/71.14 |
| 2020/0236463 | A1 | 7/2020 | Asada et al. | |

FOREIGN PATENT DOCUMENTS

| | | | |
|---|---|---|---|
| CN | 107277669 | A | 10/2017 |
| CN | 107750027 | A | 3/2018 |
| CN | 109741727 | A | 5/2019 |

* cited by examiner

METHOD AND SYSTEM FOR ACTIVE NOISE CONTROL

CROSS-REFERENCE TO RELATED APPLICATIONS

This application is a continuation of International Application No. PCT/CN2020/081161, filed on Mar. 25, 2020, the disclosure of which is hereby incorporated by reference in its entirety.

TECHNICAL FIELD

Embodiments of the present application relate to the technical field of noise control, and more specifically, to a method and system for active noise control.

BACKGROUND

With continuous development of electronic market, consumers are accustomed to using headphones to listen to music or make phone calls. However, noise pollution in cities is becoming more and more serious. In most occasions, consumers cannot hear the music when using ordinary headphones outdoors, they can only hear the music if they increase a volume of the headphones playing music to cover the noise. However, this way of increasing the playback volume of the headphones can cause hearing damage. As a result, active noise control headphones came into being.

Most of the current active noise control headphones use a sound collection device located in a headphone case to obtain an external noise signal, and invert the collected external noise signal and superimpose it with a played audio signal to achieve active noise control.

Different consumers may have different needs for sound quality of headphones. Therefore, how to meet the needs of different consumers is an urgent problem to be solved.

SUMMARY

Embodiments of the present application provide an active noise control method, system, electronic device and chip, which can meet different needs of different consumers on sound quality of headphones.

In a first aspect, a method for active noise control is provided, the method includes: determining an expected noise control curve of performing active noise control on a target object; determining a target filter according to the expected noise control curve and a filter model; and performing noise control processing on an external noise signal of the target object using the target filter.

In some possible embodiments, the method further includes: determining an expected noise control weight value of active noise control, according to the expected noise control curve; determining a reference noise weight value of active noise control and an expected filter frequency response; and the determining a target filter according to the expected noise control curve and a filter model, including: determining the target filter, according to the expected noise control weight value, the reference noise weight value, the expected filter frequency response and the filter model.

In some possible embodiments, the expected noise control weight value satisfies an equation:

$$W_{NR}(Z_i) = \frac{\frac{NR(\omega_i)}{\min(NR(\omega))} + C}{1 + C}$$

where, $Z_i = e^{jw_i t}$, $W_{NR}(Z_i)$ is the expected noise control weight value, $NR(\omega_i)$ is a noise control amplitude of the expected noise control curve at a frequency of $\omega_i$, min(NR (ω)) is the minimum value of the expected noise control curve at all frequencies, and C is a constant.

In some possible embodiments, the determining a reference noise weight value, including: collecting the external noise signal; performing a spectrum analysis on the external noise signal to obtain an amplitude spectrum of the external noise signal; and determining the reference noise weight value, according to the amplitude spectrum.

In some possible embodiments, the reference noise weight value satisfies an equation:

$$W_{ref}(Z_i) = P(\omega_i)$$

where, $W_{ref}(Z_i)$ is the reference noise weight value, and $P(\omega_i)$ is the amplitude spectrum of the external noise signal.

In some possible embodiments, the determining an expected filter frequency response, including: collecting a waveform data or a sweep frequency signal of an electroacoustic data; and determining the expected filter frequency response using the waveform data or the sweep frequency signal of an electroacoustic data.

In some possible embodiments, the filter model satisfies an equation:

$$H(Z_i)W_{ref}(Z_i)W_{NR}(Z_i) = \frac{\sum_{k=0}^{K_1-1} Z_i^{-k} b_k}{\sum_{k=0}^{K_2-1} Z_i^{-k} a_k} W_{ref}(Z_i)W_{NR}(Z_i)$$

where, $Z_i = e^{jw_i t}$, $H(Z_i)$ is the expected filter frequency response, $W_{ref}(Z_i)$ is the reference noise weight value, $W_{NR}(Z_i)$ is the expected noise control weight value, $b_k$ and $a_k$ are the $k^{th}$ coefficients of the target filter, $K_1$ is a molecular order of the target filter, and $K_2$ is a denominator order of the target filter.

In some possible embodiments, the method further includes: determining expected residual noise energy;

the determining the target filter, according to the expected noise control weight value, the reference noise weight value, the expected filter frequency response and the filter model, including: determining the target filter, according to the expected noise control weight value, the reference noise weight value, the expected filter frequency response, the expected residual noise energy and the filter model.

In some possible embodiments, the determining expected residual noise energy, including: determining an expected residual noise energy spectrum curve; and determining the expected residual noise energy based on the expected residual noise energy spectrum curve.

In some possible embodiments, the expected residual noise energy spectrum curve is even.

In some possible embodiments, an area of the maximum closed region of the expected residual noise energy spectrum curve is less than or equal to a first threshold value; or the expected residual noise energy spectrum curve is a straight line.

In some possible embodiments, the target object is an active noise control headphone, the method further including: comparing residual noise energy spectrum curves of a left headphone and a right headphone of the active noise control headphone after noise control; and if the residual noise energy spectrum curves of the left headphone and the right headphone are inconsistent, redetermining a target filter of the right headphone with residual noise of the left headphone as a target, or redetermining a target filter of the left headphone with residual noise of the right headphone as a target.

In some possible embodiments, the filter model satisfies an equation:

$$H(Z_i)W_{ref}(Z_i)W_{NR}(Z_i)=\frac{\sum_{k=0}^{K_1-1}Z_i^{-k}b_k}{\sum_{k=0}^{K_2-1}Z_i^{-k}a_k}W_{ref}(Z_i)W_{NR}(Z_i)+NE(Z_i)$$

where, $Z_i=e^{jw_it}$, $H(Z_i)$ is the expected filter frequency response, $W_{ref}(Z_i)$ is the reference noise weight value, $W_{NR}(Z_i)$ is the expected noise control weight value, $b_k$ and $a_k$ are the $k^{th}$ coefficients of the target filter, $K_1$ is a molecular order of the target filter, $K_2$ is a denominator order of the target filter, and $NE(Z_i)$ is the expected residual noise energy.

In some possible embodiments, the determining an expected noise control curve of performing active noise control on a target object, including: determining the expected noise control curve, according to a product form of the target object and/or an application scenario of the target object.

In some possible embodiments, the determining the expected noise control curve according to a product form of the target object and/or an application scenario of the target object, including: determining the expected noise control curve, according to a passive noise control performance of the target object.

In some possible embodiments, if the target object is in a scenario where a low frequency noise signal is greater than a high frequency noise signal, in the expected noise control curve, a noise control amplitude corresponding to a low frequency is greater than a noise control amplitude corresponding to a high frequency; and if the target object is in a scenario where the high frequency noise signal is greater than the low frequency noise signal, in the expected noise control curve, a noise control amplitude corresponding to the high frequency is greater than a noise control amplitude corresponding to the low frequency.

In a second aspect, an active noise control system is provided, including: a processing module, configured to determine an expected noise control curve of performing active noise control on a target object; a filter coefficient calculation module, configured to determine a target filter according to the expected noise control curve and a filter model; and a noise control module, configured to perform noise control processing on an external noise signal of the target object using the target filter.

In some possible embodiments, the processing module is further configured to: determine an expected noise control weight value of active noise control, according to the expected noise control curve; determine a reference noise weight value and an expected filter frequency response of active noise control; and the filter coefficient calculation module is specifically configured to: determine the target filter, according to the expected noise control weight value, the reference noise weight value, the expected filter frequency response and the filter model.

In some possible embodiments, the processing module is further configured to determine an expected residual noise energy spectrum curve; and determine the expected residual noise energy based on the expected residual noise energy spectrum curve.

In some possible embodiments, the expected noise control weight value satisfies an equation:

$$W_{NR}(Z_i)=\frac{\frac{NR(\omega_i)}{\min(NR(\omega))}+C}{1+C}$$

where, $Z_i=e^{jw_it}$, $W_{NR}(Z_i)$ is the expected noise control weight value, $NR(\omega_i)$ is a noise control amplitude of the expected noise control curve at a frequency of $\omega_i$, $\min(NR(\omega))$ is the minimum value of the expected noise control curve at all frequencies, and C is a constant.

In some possible embodiments, it further includes: a data collection module, configured to collect the external noise signal; the processing module is specifically configured to: perform a spectrum analysis on the external noise signal to obtain an amplitude spectrum of the external noise signal; and determine the reference noise weight value, according to the amplitude spectrum.

In some possible embodiments, the reference noise weight value satisfies an equation:

$$W_{ref}=(Z_i)=P(\omega_i)$$

where, $W_{ref}(Z_i)$ is the reference noise weight value, and $P(\omega_i)$ is the amplitude spectrum of the external noise signal.

In some possible embodiments, it further includes: a data collection module, configured to collect a waveform data or a sweep frequency signal of an electroacoustic data; and the processing module is specifically configured to: determine the expected filter frequency response using the waveform data or the sweep frequency signal of an electroacoustic data.

In some possible embodiments, the filter model satisfies an equation:

$$H(Z_i)W_{ref}(Z_i)W_{NR}(Z_i)=\frac{\sum_{k=0}^{K_1-1}Z_i^{-k}b_k}{\sum_{k=0}^{K_2-1}Z_i^{-k}a_k}W_{ref}(Z_i)W_{NR}(Z_i)$$

where, $Z_i=e^{jw_it}$, $H(Z_i)$ is the expected filter frequency response, $W_{ref}(Z_i)$ is the reference noise weight value, $W_{NR}(Z_i)$ is the expected noise control weight value, $b_k$ and $a_k$ are the $k^{th}$ coefficients of the target filter, $K_1$ is a molecular order of the target filter, and $K_2$ is a denominator order of the target filter.

In some possible embodiments, the processing module is further configured to: determine expected residual noise energy; and the filter coefficient calculation module is specifically configured to: determine the target filter, according to the expected noise control weight value, the reference noise weight value, the filter frequency response, the expected residual noise energy, and the filter model.

In some possible embodiments, the processing module is specifically configured to: determine an expected residual noise energy spectrum curve; and determine the expected residual noise energy based on the expected residual noise energy spectrum curve.

In some possible embodiments, the expected residual noise energy spectrum curve is even.

In some possible embodiments, an area of the maximum closed region of the expected residual noise energy spectrum curve is less than or equal to a first threshold value; or the expected residual noise energy spectrum curve is a straight line.

In some possible embodiments, the target object is an active noise control headphone, the processing module is further configured to: compare residual noise energy spectrum curves of a left headphone and a right headphone of the active noise control headphone after noise control; and the filter coefficient calculation module is further configured to: if the residual noise energy spectrum curves of the left headphone and the right headphone are inconsistent, redetermine a target filter of the right headphone with residual noise of the left headphone as a target, or redetermine a target filter of the left headphone with residual noise of the right headphone as a target.

In some possible embodiments, the filter model satisfies an equation:

$$H(Z_i)W_{ref}(Z_i)W_{NR}(Z_i) = \frac{\sum_{k=0}^{K_1-1} Z_i^{-k} b_k}{\sum_{k=0}^{K_2-1} Z_i^{-k} a_k} W_{ref}(Z_i)W_{NR}(Z_i) + NE(Z_i)$$

where, $Z_i=e^{jw_it}$, $H(Z_i)$ is the expected filter frequency response, $W_{ref}(Z_i)$ is the reference noise weight value, $W_{NR}(Z_i)$ is the expected noise control weight value, $b_k$ and $a_k$ are the $k^{th}$ coefficients of the target filter, $K_1$ is a molecular order of the target filter, $K_2$ is a denominator order of the target filter, and $NE(Z_i)$ is the expected residual noise energy.

In some possible embodiments, the processing module is specifically configured to: determine the expected noise control curve according to a product form of the target object and/or an application scenario of the target object.

In some possible embodiments, the processing module is specifically configured to: determine the expected noise control curve, according to a passive noise control performance of the target object.

In some possible embodiments, if the target object is in a scenario where a low frequency noise signal is greater than a high frequency noise signal, in the expected noise control curve, a noise control amplitude corresponding to a low frequency is greater than a noise control amplitude corresponding to a high frequency; and if the target object is in a scenario where the high frequency noise signal is greater than the low frequency noise signal, in the expected noise control curve, a noise control amplitude corresponding to the high frequency is greater than a noise control amplitude corresponding to the low frequency.

In a third aspect, an electronic device is provided, including: the active noise control system in the second aspect or any possible implementation manners of the second aspect.

In some possible embodiments, the electronic device is an active noise control headphone, the active noise control headphone further includes:

a headphone case; where, the active noise control system is arranged in the headphone case.

In a fourth aspect, a chip is provided to implementing the method in the first aspect, including a memory and a processor;

the memory being coupled to the processor;

the memory, configured to store a program instruction; and the processor, configured to invoke the program instruction stored in the memory, enabling the chip to execute the method for active noise control in the first aspect.

With the above technical solution, users can set an expected noise control curve according to their own needs for sound quality. For example, only the external noise signal below 300 Hz is reduced, and the filter can reduce the external noise signal according to the expected noise control curve set by the user. That is, the noise control is performed by the filter according to the users' needs, so that different needs of different consumers on sound quality can be satisfied.

DESCRIPTION OF EMBODIMENTS

Technical solutions in embodiments of the present application will be described hereinafter with reference to the accompanying drawings.

A method for active noise control provided in the embodiments of the present application may be applied to a headphone, and the headphone may be an active noise control headphone, for example, the headphone may be an in-ear headphone, a semi-in-ear headphone, or a headset. Among them, the headphone may be in various scenarios, such as car driving, home, office, factory.

Figure 1:
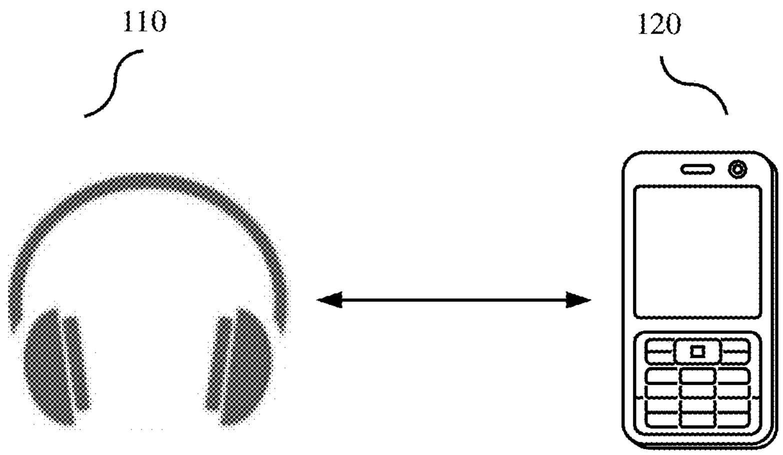
FIG. 1 is a schematic application diagram of a method for active noise control according to an embodiment of the present application.

When the method for active noise control of the embodiments of the present application is applied to a headphone, an application manner of the headphone may be, for example, as shown in FIG. 1. The application manner may include a headphone 110 and a terminal 120. The headphone 110 is connected to the adapted terminal 120, which in particular, may be a wired connection or a wireless connection (e.g. Bluetooth). The terminal 120 may be a device with a playback function, for example, the terminal 120 may be a radio, a music player, a mobile phone, a computer, and the like.

Figure 2:
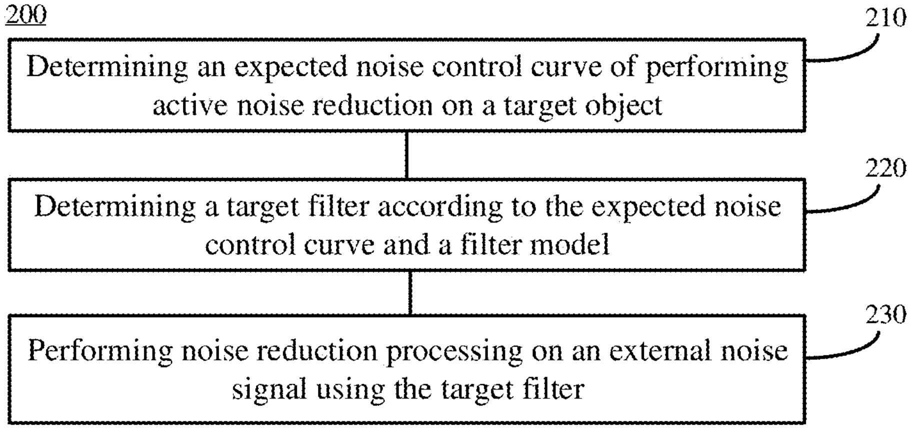
FIG. 2 is a schematic flowchart of the method for active noise control according to an embodiment of the present application.

FIG. 2 is a schematic flowchart of a method 200 for active noise control according to an embodiment of the present application. The method shown in FIG. 2 may be performed by an active noise control system. The active noise control system may be, for example, the active noise control system in the headphone 110 shown in FIG. 1.

It should be understood that, in the embodiments of the present application, the active noise control system may also be referred to as an active noise control (ANC) system.

It should also be understood that the method 200 for active noise control in the embodiments of the present application may be applicable to feedforward active noise control, feedback active noise control, or hybrid active noise control.

As shown in FIG. 2, the method 200 may include at least some of the following contents.

In 210, determining an expected noise control curve of performing active noise control on a target object.

Where the target object may be, but not limited to, an active noise control headphone, speaker of electronic device, and the like. For the convenience of description, the method 200 will be described below by taking the target object as an active noise control headphone as an example.

Consumers may have different requirements for noise control effect of headphones. In order to meet the different needs of different consumers for sound quality of the headphones, noise control may be performed according to the determined expected noise control curve. The expected noise control curve may be selected by the consumer, or a default setting of the headphone before leaving the factory, or determined during the user's usage, which is not limited in the present embodiment.

Optionally, in the embodiments of the present application, the active noise control system may determine the expected noise control curve, according to a product form of the target object and/or an application scenario of the target object.

Figure 3:
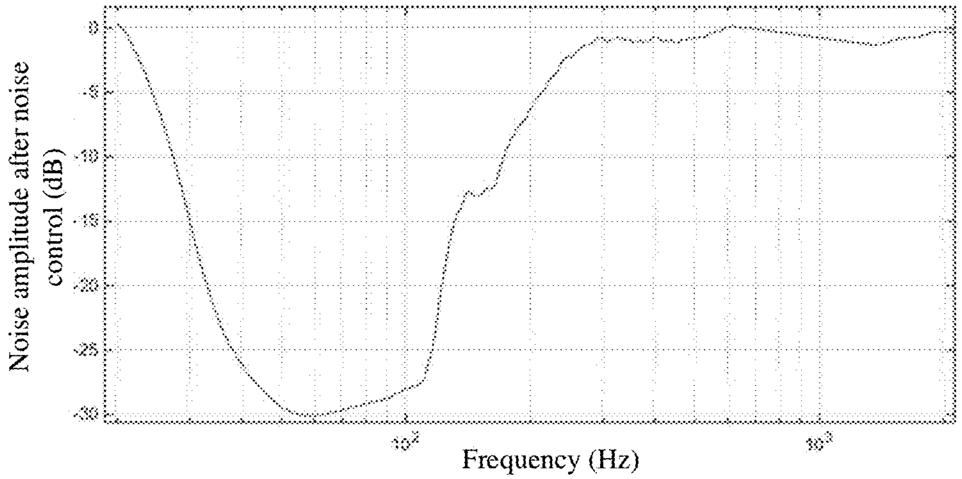
FIG. 3 is a schematic diagram of an expected noise control curve of an embodiment of the present application.

For different application scenarios, the expected noise control curve may be different. For example, when the active noise control headphone is used in a monitor mode, the active noise control system may reduce only very low frequency noise, such as noise below 300 Hz. In this case, the expected noise control curve may be as shown in FIG. 3.

For another example, if the active noise control headphone is in an outdoor scenario, there may be an external noise signal such as a vehicle. In this case, a high frequency noise signal may be greater than a low frequency noise signal, then in the expected noise control curve, a noise control amplitude corresponding to the low frequency is smaller than a noise control amplitude corresponding to the high frequency. If the active noise control headphone is in an indoor or a closed environment, such as an airplane, in this time, the low frequency noise signal may be greater than the high frequency noise signal, then in the expected noise control curve, the noise control amplitude corresponding to the high frequency is smaller than the noise control amplitude corresponding to the low frequency.

For the product form of the active noise control headphone, the expected noise control curve may be different. Optionally, the active noise control system may determine the expected noise control curve, according to a passive noise control performance of the target object.

Figure 4:
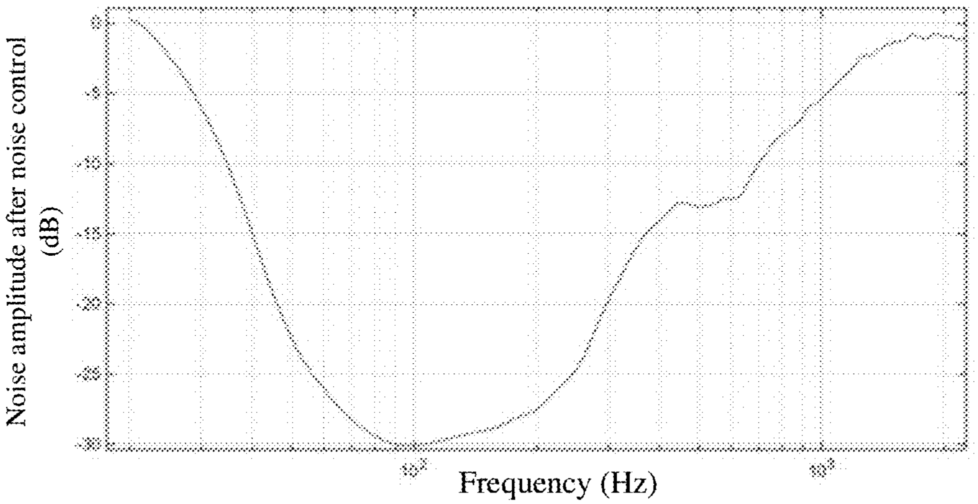
FIG. 4 is a schematic diagram of another expected noise control curve of an embodiment of the present application.

For example, while the active noise control headphone with the passive noise control performance may reduce a noise signal above 1000 Hz, the active noise control system may reduce a noise signal below 1000 Hz. At this time, the expected noise control curve may be as shown in FIG. 4, and in the present embodiment, the expected noise control curve may be a function of frequency.

Under different application scenarios or different product forms, the expected noise control curve is different. The above technical solution determines the expected noise control curve according to the product form and/or application scenario. In this case, the active noise control system can perform the maximum noise control on the external noise signal according to the current application scenario and/or product form, so as to achieve effective noise control for the external noise signal.

In 220, determining a target filter according to the expected noise control curve and a filter model.

After the expected noise control curve is determined, the active noise control system may determine an expected noise control weight value of the system for active noise control according to the expected noise control curve.

In a possible embodiment, the expected noise control weight value may be as shown in equation (1):

$$W_{NR}(Z_i) = \frac{\frac{NR(\omega_i)}{\min(NR(\omega))} + C}{1 + C} \tag{1}$$

where, $Z_i=e^{jw_it}$, $W_{NR}(Z_i)$ is the expected noise control weight value, $NR(\omega_i)$ is a noise control amplitude of the expected noise control curve at a frequency of $\omega_i$, min(NR (ω)) is the minimum value of the expected noise control curve at all frequencies, and C is a constant.

For example, referring to the expected noise control curve in FIG. 4, the noise control amplitude is 30 dB when the frequency is 100 Hz, that is, for an external noise signal of 100 Hz, the active noise control system is reduced by 30 dB, that is, NR(100)=30 dB; when the frequency is 700 Hz, the noise control amplitude is 10 dB, that is, NR(700)=10 dB.

Figure 5:
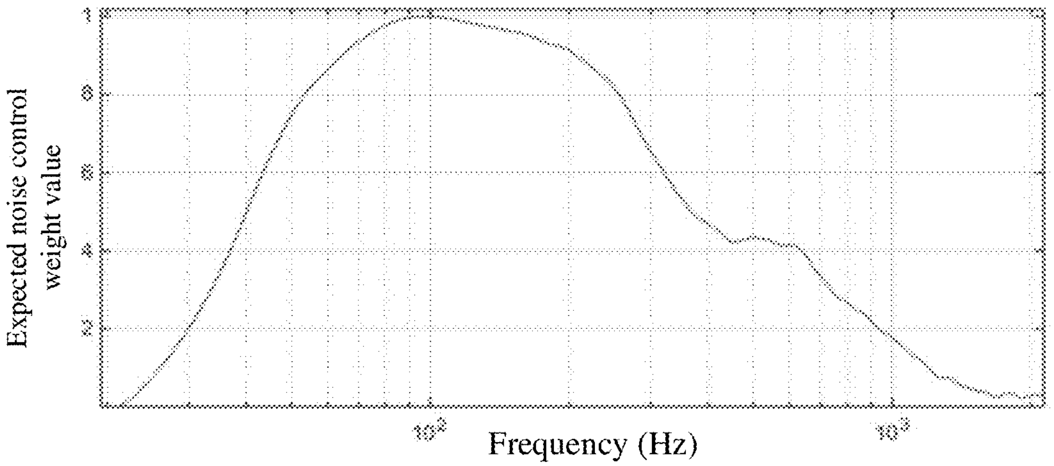
FIG. 5 is a schematic diagram of an expected noise control weight value curve of an embodiment of the present application.

The schematic diagram of an expected noise control weight value determined according to the expected noise control curve shown in FIG. 4 is shown in FIG. 5, and it can be seen that the expected noise control curve and the expected noise control weight value curve are basically symmetrical. The greater the noise control amplitude of the active noise control system for an external noise signal at a certain frequency is, the greater the expected noise control weight value at that frequency will be. For example, the noise control amplitude of the active noise control system is the largest at 100 Hz, and the expected noise control weight value is the largest at 100 Hz.

Optionally, the method 200 may further include: the active noise control system determining a reference noise weight value of active noise control and an expected filter frequency response.

Among them, the filter frequency response may include a feedforward filter frequency response, or a feedforward filter frequency response, or a secondary path filter frequency response.

The implementation manner of determining the expected filter frequency response will be described in detail below.

As an example, the active noise control system may calculate the expected filter frequency response using a swept frequency signal and an audio analysis device.

Taking the audio analysis device being an audio precision (AP) as an example, the AP outputs a swept frequency signal, and the active noise control system receives the swept frequency signal and processes the swept frequency signal to obtain a processed signal. After that, the active noise control system outputs the processed signal to the AP, and after receiving the processed signal, the AP can calculate the expected filter frequency response.

It should be understood that, in the present embodiment of the present application, the swept frequency signal may also be referred to as a swept frequency response data.

As another example, the active noise control system may utilize a pulse code modulation (PCM) data or a swept frequency response data to determine the expected filter frequency response using a data analysis method.

Among them, the data analysis method may include, but is not limited to, a direct frequency response division method, a time-domain adaptive filter method, a frequency-domain adaptive filter method, and the like. For example, if the data analysis method is the direct frequency response division method, an input signal is X and an output signal is Y, then the expected filter frequency response is $H(Z_i)=Y/X$.

The active noise control system can collect a PCM data or a swept frequency response data before determining the expected filter frequency response.

Optionally, the active noise control system may collect the swept frequency response data or the PCM data before the active noise control headphone leaves the factory, or collect the PCM data during the operation of the active noise control headphone (for example, when the user uses the active noise control headphone to play music).

The implementation manner of determining the reference noise weight value will be described in detail below. Optionally, in the embodiments of the present application, the active noise control system may collect an external noise signal in an environment where the active noise control headphone is located, and then determine the reference noise weight value according to the external noise signal, so that the active noise control system may be applied to different types of noise control.

Specifically, after collecting the external noise signal, the active noise control system can perform a spectrum analysis on the external noise signal to obtain an amplitude spectrum of the external noise signal. Then, the active noise control system can determine the reference noise weight value according to the amplitude spectrum of the external noise signal.

Optionally, spectrum analysis methods may include but is not limited to Fast Fourier Transform (FFT), Discrete Fourier Transform (DFT), Chirp Z-Transform (CZT), and the like.

As an example, the reference noise weight value can satisfy an equation:

$$W_{ref}(Z_i)=P(\omega_i) \tag{2}$$

where $P(\omega_i)$ is the amplitude spectrum of the external noise signal.

Optionally, the filter model in the embodiments of the present application can satisfy an equation:

$$H(Z_i)W_{ref}(Z_i)W_{NR}(Z_i)=\frac{\sum_{k=0}^{K_1-1} Z_i^{-k} b_k}{\sum_{k=0}^{K_2-1} Z_i^{-k} a_k} W_{ref}(Z_i)W_{NR}(Z_i) \tag{3}$$

where $H(Z_i)$ is the expected filter frequency response, $W_{ref}(Z_i)$ is the reference noise weight value, $b_k$ and $a_k$ are the $k^{th}$ coefficients of the target filter, $K_1$ is a molecular order of the target filter, and $K_2$ is a denominator order of the target filter. Exemplified, $K_1$ and $K_2$ can both be equal to 8.

The magnitudes of $K_1$ and $K_2$ may be related to the expected filter frequency response. For example, when the expected filter frequency response changes relatively steep and conversions are relatively complicated and when there are many peaks and valleys, $K_1$ and $K_2$ are usually relatively great. Of course, $K_1$ and $K_2$ may also be related to other factors, which will not be described in detail in the embodiments of the present application.

Among them, the filter model may be a finite impulse response (FIR) filter least squares solution model, or may be an infinite impulse response (IIR) least squares solution model, or an adaptive filter model.

After determining the expected noise control weight value, the reference noise weight value and the expected filter frequency response, the active noise control system can calculate $a_k$ and $b_k$ according to the expected noise control weight value, the reference noise weight value, the expected filter frequency response and the filter model, thereby determining the target filter.

The calculation method of filter coefficients $b_k$ and $a_k$ will be described in detail later, and will not be introduced here.

Figure 6:
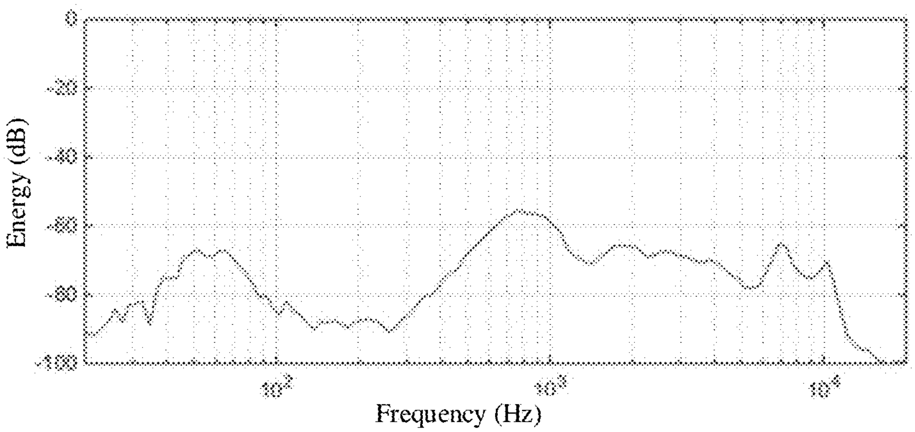
FIG. 6 is a schematic diagram of an uneven residual noise energy spectrum curve of an embodiment of the present application.

At present, a goal of active noise control is to reduce noise in the maximum intensity, that is, to minimize the residual noise after active noise control, but the active noise control system has different noise control capabilities for external noise signals of different frequencies, so there will be the problem of uneven residual noise after active noise control. FIG. 6 is a schematic diagram of a frequency response curve of a residual noise. It can be seen that although the residual noise is small, that is, the noise control performance is strong, the energy of the residual noise is relatively large near the frequency of 700 Hz. In this case, the user can still listen to a relatively great noise. In addition, the residual noise is uneven, and the user's sense of hearing will be very uncomfortable.

In view of this, in another implementation manner, the active noise control system can determine an expected residual noise energy, so that the active noise control system can determine the target filter, according to the expected noise control weight value, the reference noise weight value, the expected filter frequency response, the expected residual noise energy and the filter model.

Optionally, another filter model in the embodiments of the present application can satisfy an equation:

$$H(Z_i)W_{ref}(Z_i)W_{NR}(Z_i)=\frac{\sum_{k=0}^{K_1-1} Z_i^{-k} b_k}{\sum_{k=0}^{K_2-1} Z_i^{-k} a_k} W_{ref}(Z_i)W_{NR}(Z_i)+NE(Z_i) \tag{4}$$

wherein, $NE(Z_i)$ is the expected residual noise energy.

Specifically, the user can set the expected residual noise energy spectrum curve, and then the active noise control system determines $NE(Z_i)$ according to the set expected residual noise energy spectrum curve. If the expected residual noise energy spectrum curve at the frequency of $\omega_i$ is Y, then $NE(Z_i)$ of the residual noise at the frequency $\omega_i$ equals to Y.

In the embodiments of the present application, the expected residual noise energy spectrum curve is even.

Figure 7:
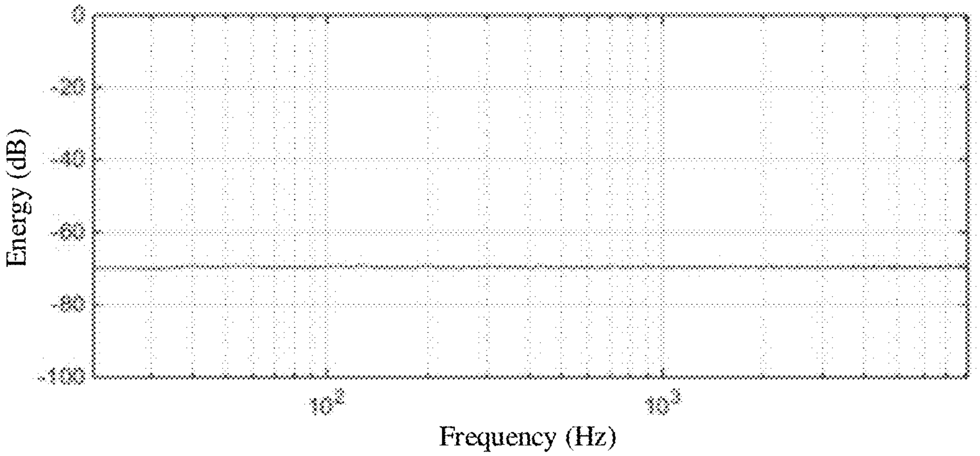
FIG. 7 is a schematic diagram of an even residual noise energy spectrum curve of an embodiment of the present application.
Figure 8:
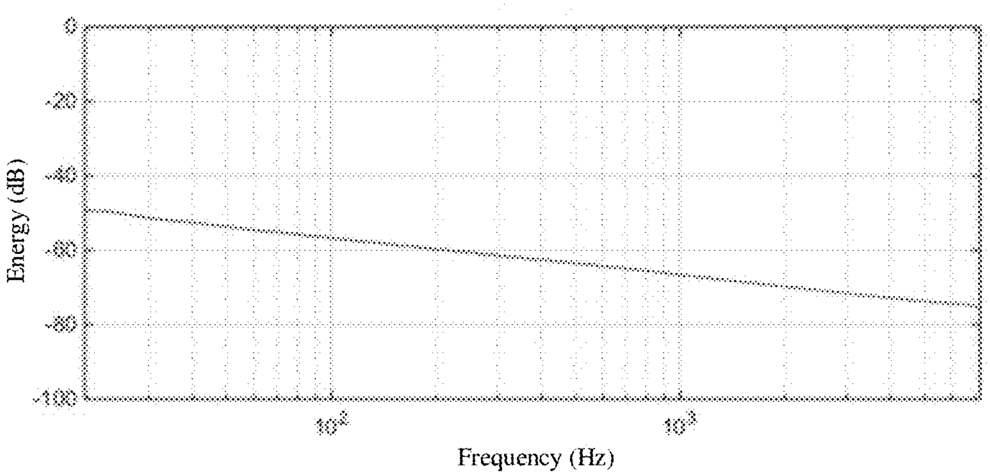
FIG. 8 is a schematic diagram of an even residual noise energy spectrum curve of an embodiment of the present application.

As an example, the expected residual noise energy spectrum curve may be a straight line. For example, similar to white noise, the expected residual noise energy spectrum curve can be an even straight line (refer to FIG. 7), that is, the energy of residual noise is equal at all frequencies. It can be seen from FIG. 7 that the energy of residual noise at all frequencies is −70 dB, then $NE(Z_i)=-70$. Alternatively, it may be similar to pink noise that the expected residual noise energy spectrum curve can be a sloping line (refer to FIG. 8). Taking FIG. 8 as an example, the energy of residual noise at 200 Hz is −60 dB, then the energy at 200 Hz $NE(Z_i)=-60$. In this example, the expected residual noise energy spectrum curve is even.

It should be noted that the energy mentioned in the embodiments of the present application refers to normalized energy.

As another example, the expected residual noise energy spectrum curve may be a curve of any shape. In this case, an area of the maximum closed region of the expected residual noise energy spectrum curve is less than or equal to a first threshold value.

Figure 9:
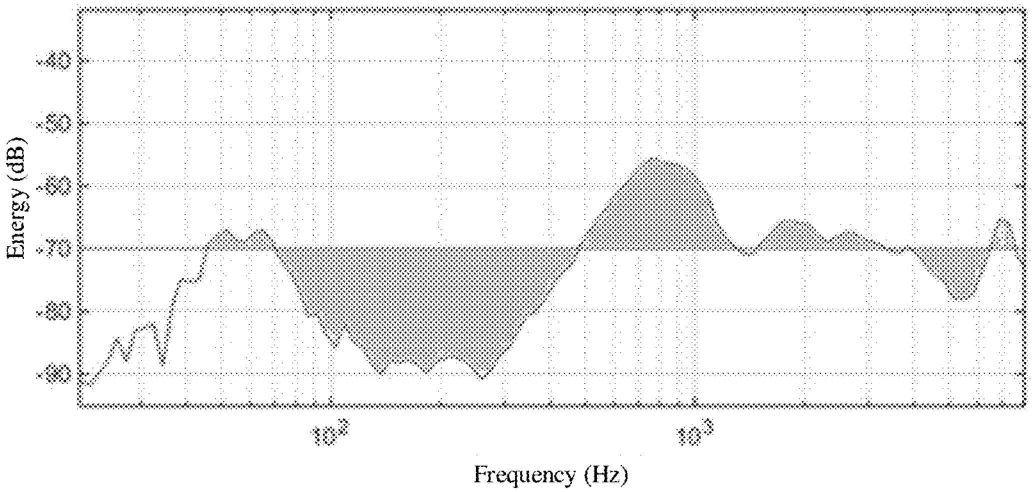
FIG. 9 is a schematic diagram of a method for measuring evenness of residual noise of an embodiment of the present application.

As shown in FIG. 9, the expected residual noise energy spectrum curve is an irregular curve, and the shaded part is the maximum closed region of the expected residual noise energy spectrum curve. If an area of the shaded part is less than or equal to the first threshold, then the expected residual noise energy spectrum curve in FIG. 9 is even.

It can be known that the closed region is formed by two curves, one of which (referred to as a first curve) is the expected residual noise energy spectrum curve, and the other curve (referred to as a second curve) in FIG. 9 is a curve with a vertical coordinate of −70 dB and a slope of 0.

In the process of determining the second curve, optionally, first of all, the second curve can be set as an arbitrary curve, for example, a curve with a vertical coordinate of −65 dB and a slope of 0, a curve with a vertical coordinate of −70 dB and a slope of 0, and a curve with a vertical coordinate of −80 dB and a slope of 0, and the like; and then the areas of the closed regions are calculated separately. The calculation result is that when the second curve is a curve with a vertical coordinate of −70 dB and a slope of 0, the area of the closed region is the largest, and thus FIG. 9 can be obtained.

In another possible embodiment, an area of the minimum closed region of the expected residual noise energy spectrum curve is less than or equal to the first threshold value.

In this way, the filter model in equation (4) can make the residual noise of active noise control more even, and the user's sense of hearing is more comfortable.

If the expected residual noise energy spectrum curve does not satisfy a requirement on evenness, then $K_1$ and/or $K_2$ may be increased. For example, if $K_1$ and $K_2$ are both equal to 8, then both $K_1$ and $K_2$ can be increased to 16. Alternatively, the number of iterations can be increased during the process of determining the target filter. Alternatively, if the residual noise energy is significantly different from the expected residual noise energy at that frequency, the expected residual noise energy corresponding to that frequency may be updated. Specifically, if the residual noise energy at that frequency is greater than the expected residual noise energy, the expected residual noise energy at the frequency can be reduced, that is, the expected residual noise energy corresponding to that frequency can be set lower. If the residual noise energy at that frequency is less than the expected residual noise energy, the expected residual noise energy at that frequency can be increased, that is, the expected residual noise energy corresponding to that frequency can be set higher. In this way, the evenness of the expected residual noise energy spectrum curve can be better than before.

It should be noted that $W_{ref}(Z_i)$ and $W_{NR}(Z_i)$ at two sides of the equation in equation (3) and equation (4) cannot be directly canceled. Since equation (3) and equation (4) are high-dimensional equations, there is usually no direct solution, and only the least squares solution can be obtained. Therefore, there is an error between the solved least squares solution and the real solution of equation (3), and $W_{ref}(Z_i)$ and $W_{NR}(Z_i)$ can control the distribution of errors at different frequencies.

It should be noted that the term "and/or" herein is merely a description of the associated relationship of associated objects, which indicates that there may be three relationships. For example, A and/or B may indicate three situations: A exists alone, both A and B exist, and B exists alone.

It should be understood that in the embodiment of the present application, "first" and "second" are merely used for distinguishing different objects, and are not intended to limit the scope of this embodiment of the present application.

Hereinafter, the calculation method for filter coefficients $b_k$ and $a_k$ will be described by taking the filter model of equation (3) as an example.

When the filter model is a FIR filter model, $a_0=1$, $a_1=a_{K2}= \ldots a_{K2-1}=0$, then the FIR filter model can be simplified as:

$$H(Z_i)W_{ref}(Z_i)W_{NR}(Z_i)=\Sigma_{k=0}^{K1-1}Z_i^{-k}b_kW_{ref}(Z_i)W_{NR}(Z_i) \tag{5}$$

For the convenience of calculation, the FIR filter model is expressed as AX=B where $$A=\begin{bmatrix} W(z_1)z_1^0 & W(z_1)z_1^{-1} & \ldots & W(z_1)z_1^{-(K_1-1)} \\ W(z_2)z_2^0 & W(z_2)z_2^{-1} & \ldots & W(z_1)z_2^{-(K_1-1)} \\ \vdots & \vdots & \vdots & \\ W(z_N)z_N^0 & W(z_N)z_N^{-1} & \ldots & W(z_1)z_N^{-(K_1-1)} \end{bmatrix}$$

$$X=\begin{bmatrix} b_1 \\ b_2 \\ \vdots \\ b_{K_1} \end{bmatrix}$$

$$B=\begin{bmatrix} H(z_1)W(z_1) \\ H(z_2)W(z_2) \\ \vdots \\ H(z_N)W(z_N) \end{bmatrix}$$

Thus, the solution of the equation, that is, the least squares solution of the FIR filter model, can be obtained as: $X=(A^T A)^{-1} B$.

When the filter model is an IIR filter, the process of determining $a_k$ and $b_k$ is as follows:

Step 1: Initializing $a_k$, where $a_k$ may be a random value or any empirical value, so the IIR filter model may be simplified to the FIR filter model.

Step 2: Calculating the value of $b_k$ in the FIR filter model. The process of determining $b_k$ may refer to the description of the foregoing content. For brevity of the content, details are not described herein again.

Step 3: Introducing the value of $b_k$ into the IIR filter model after calculating the value of $b_k$, and calculating $a_k$.

Repeating and iterating Steps 2 and 3 until the residual error is less than or equal to the second threshold. Among them, the residual error may be expressed as:

$$E = H(Z_i)W_{ref}(Z_i)W_{NR}(Z_i) - \frac{\sum_{k=0}^{K_1-1} Z_i^{-k} b_k}{\sum_{k=0}^{K_2-1} Z_i^{-k} a_k} W_{ref}(Z_i)W_{NR}(Z_i) \tag{6}$$

Optionally, the second threshold may be related to the headphone structure of the active noise control headphone or the customer's requirement, or the like.

Optionally, in the embodiments of the present application, the method 200 may further include: collecting at least one of gravitational acceleration data, photoelectric data, and location data, and then performing scenario recognition and/or user state recognition according to at least one of gravitational acceleration data, photoelectric data, and location data.

Among them, the gravitational acceleration data may be used to determine a current state of the user, such as whether the user is currently running For example, the photoelectric data can be used to determine a user's heart rate, and the active noise control system can more accurately determine the user's current state by combining the user's heart rate and gravitational acceleration. The location data can be used to determine the location of the user at the current moment to determine the current application scenario.

In this way, on the one hand, after the current moment, when the user is in the same scene, the active noise control system can reuse the previously determined target filter to perform noise control processing, thereby improving noise control efficiency.

On the other hand, after the current moment, when the user is in the same scenario, the active noise control system can optimize a previously determined target filter based on the currently collected data.

On the other hand, the active noise control system can determine the expected noise control curve of the active noise control according to the identified scenario, so that more effective noise control processing can be implemented based on the expected noise control curve.

For example, if the active noise control system recognizes that the user is currently indoors, as mentioned above, the low frequency noise signal may be greater than the high frequency noise signal, then in the determined expected noise control curve, the noise control amplitude corresponding to the high frequency is smaller than the noise control amplitude corresponding to the low frequency.

In 230, performing noise control processing on an external noise signal using the target filter.

Specifically, the active noise control system can use a filter to generate an inverted signal with an opposite phase of the external noise signal, and superimpose the inverted signal with the external noise signal, so as to cancel the external noise signal and implement the noise control processing of the external noise signal.

If the target object is an active noise control headphone, because there may be differences between a right headphone and a left headphone of the active noise control headphone, such as the difference between the components, and the difference between the structures, then after active noise control, the residual noise energy spectrum curve of the right headphone and the left headphone may be inconsistent. Further, the way of wearing the headphones, such as wearing the left headphone loosely and the right headphone tightly, may also cause the residual noise energy spectrum curve between the right headphone and the left headphone to be inconsistent, thus making the user's sense of hearing uncomfortable.

In view of this, the method 200 may further include: comparing the residual noise energy spectrum of the left headphone and the right headphone of the active noise control headphone after noise control, if the residual noise energy spectrum curves of the left headphone and the right headphone are inconsistent, the active noise control system can recalculate the filter coefficient of the other headphone based on equation (4) with the residual noise of one of the headphone as the target. That is, the active noise control system can redetermine a target filter of the right headphone with residual noise of the left headphone as a target, or redetermine the target filter of the left headphone with residual noise of the right headphone as a target.

Embodiments of the present application does not specifically limit the number of times of recalculating the filter coefficients of the left headphone or the right headphone. Optionally, in order to improve the efficiency of the active noise control, the active noise control system may recalculate the filter coefficients of the left headphone or the right headphone only once.

The above technical solution can make the residual noise of the left headphone and the right headphone of the active noise control headphone consistent, and the user's sense of hearing is more comfortable.

It should be noted that the embodiments of the present application do not limit the target filters applied to the left headphone and the right headphone, that is, the target filters applied to the left headphone and the right headphone may be the same or different.

In the embodiments of the present, with the above technical solution, users can set an expected noise control curve according to their own needs for sound quality. For example, only the external noise signal is reduced below 300 Hz, and the filter can reduce the external noise signal according to the expected noise control curve set by the user. That is, the noise control is performed by the filter according to the users' needs, so that different needs of different consumers on sound quality can be satisfied.

In the embodiments of the present application, the size of the sequence number of the foregoing processes does not mean the order of execution, and the order of execution of the processes should be determined by its function and internal logic, and should not constitute any limitation to the implementation process of the embodiments of the present application.

In addition, under a premise of no conflict, various embodiments and/or technical features in the various embodiments described in the present application may be combined with each other arbitrarily, and the technical solutions obtained after the combination should also fall within the protection scope of the present application.

The method for active noise control of the embodiments of the present application is described in detail above, and the active noise control system of the embodiments of the present application will be described below. It should be understood that the active noise control system in the embodiments of the present application can execute the method for active noise control in the embodiments of the present application, and has the function of executing the corresponding method.

Figure 10:
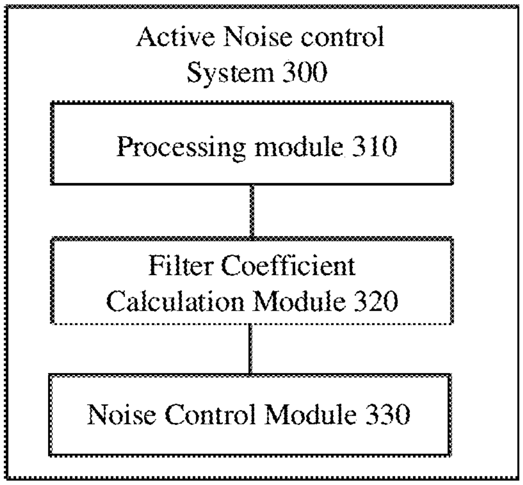
FIG. 10 is a schematic block diagram of an active noise control system of an embodiment of the present application.

FIG. 10 shows a schematic block diagram of an active noise control system 300 of an embodiment of the present application. As shown in FIG. 10, the active noise control system 300 may include:

a processing module 310, configured to determine an expected noise control curve of performing active noise control on a target object;

a filter coefficient calculation module 320, configured to determine a target filter according to the expected noise control curve and a filter model; and a noise control module 330, configured to perform noise control processing on an external noise signal of the target object using the target filter.

Optionally, in the embodiments of the present application, the processing module 310 is further configured to: determine an expected noise control weight value of active noise control, according to the expected noise control curve; determine a reference noise weight value and an expected filter frequency response of active noise control; and the filter coefficient calculation module 320 is specifically configured to: determine the target filter, according to the expected noise control weight value, the reference noise weight value, the expected filter frequency response, and the filter model.

Optionally, in the embodiments of the present application, the expected noise control weight value satisfies an equation:

$$W_{NR}(Z_i)=\frac{\frac{NR(\omega_i)}{\min(NR(\omega))}+C}{1+C}$$

where, $Z_i=e^{jw_it}$, $W_{NR}(Z_i)$ is the expected noise control weight value, $NR(\omega_i)$ is a noise control amplitude of the expected noise control curve at a frequency of $\omega_i$, $\min(NR(\omega))$ is the minimum value of the expected noise control curve at all frequencies, and C is a constant.

Optionally, in the embodiments of the present application, the active noise control system 300 further includes: a data collection module 340, configured to collect the external noise signal; and the processing module 310 is specifically configured to: perform a spectrum analysis on the external noise signal to obtain an amplitude spectrum of the external noise signal; and determine the reference noise weight value, according to the amplitude spectrum.

Optionally, in the embodiments of the present application, the reference noise weight value satisfies an equation:

$$W_{ref}(Z_i)=P(\omega_i)$$

where, $W_{ref}(Z_i)$ is the reference noise weight value, and $P(\omega_i)$ is the amplitude spectrum of the external noise signal.

Optionally, in the embodiments of the present application, the active noise control system 300 further includes: a data collection module 340, configured to collect a waveform data or a sweep frequency signal of an electroacoustic data.

The processing module 310 is specifically configured to: determine the expected filter frequency response using the waveform data or the sweep frequency signal of the electroacoustic data.

Optionally, in the embodiments of the present application, the filter model satisfies an equation:

$$H(Z_i)W_{ref}(Z_i)W_{NR}(Z_i)=\frac{\sum_{k=0}^{K_1-1}Z_i^{-k}b_k}{\sum_{k=0}^{K_2-1}Z_i^{-k}a_k}W_{ref}(Z_i)W_{NR}(Z_i)$$

where, $Z_i=e^{jw_it}$, $H(Z_i)$ is the expected filter frequency response, $W_{ref}(Z_i)$ is the reference noise weight value, $W_{NR}(Z_i)$ is the expected noise control weight value, $b_k$ and $a_k$ are the $k^{th}$ coefficients of the target filter, $K_1$ is a molecular order of the target filter, and $K_2$ is a denominator order of the target filter.

Optionally, in the embodiments of the present application, the processing module 310 is further configured to: determine an expected residual noise energy; and the filter coefficient calculation module 320 is specifically configured to: determine the target filter, according to the expected noise control weight value, the reference noise weight value, the expected filter frequency response, the expected residual noise energy, and the filter model.

Optionally, in the embodiments of the present application, the processing module 310 is specifically configured to: determine an expected residual noise energy spectrum curve; and determine the expected residual noise energy based on the expected residual noise energy spectrum curve.

Optionally, in the embodiments of the present application, the expected residual noise energy spectrum curve is even.

Optionally, in the embodiments of the present application, an area of the maximum closed region of the expected residual noise energy spectrum curve is less than or equal to a first threshold value; or the expected residual noise energy spectrum curve is a straight line.

Optionally, in the embodiments of the present application, the target object is an active noise control headphone, the processing module 310 is further configured to: compare residual noise energy spectrum curves of a left headphone and a right headphone of the active noise control headphone after noise control; and the filter coefficient calculation module 320 is further configured to: if the residual noise energy spectrum curves of the left headphone and the right headphone are inconsistent, redetermine the target filter of the right headphone with residual noise of the left headphone as a target, or redetermine the target filter of the left headphone with residual noise of the right headphone as a target.

Optionally, in the embodiments of the present application, the filter model satisfies an equation:

$$H(Z_i)W_{ref}(Z_i)W_{NR}(Z_i)=\frac{\sum_{k=0}^{K_1-1}Z_i^{-k}b_k}{\sum_{k=0}^{K_2-1}Z_i^{-k}a_k}W_{ref}(Z_i)W_{NR}(Z_i)+NE(Z_i)$$

where, $Z_i=e^{jw_it}$, $H(Z_i)$ is the expected filter frequency response, $W_{ref}(Z_i)$ is the reference noise weight value, $W_{NR}(Z_i)$ is the expected noise control weight value, $b_k$ and $a_k$ are the $k^{th}$ coefficients of the target filter, $K_1$ is a molecular order of the target filter, $K_2$ is a denominator order of the target filter, and $NE(Z_i)$ is the expected residual noise energy.

Optionally, in the embodiments of the present application, the processing module 310 is specifically configured to: determine the expected residual noise control curve according to a product form of the target object and/or an application scenario of the target object.

Optionally, in the embodiments of the present application, the processing module 310 is specifically configured to: determine the expected noise control curve, according to a passive noise control performance of the target object.

Optionally, in the embodiments of the present application, if the target object is in a scenario where a low frequency noise signal is greater than a high frequency noise signal, in the expected noise control curve, a noise control amplitude corresponding to a low frequency is greater than a noise control amplitude corresponding to a high frequency; and if the target object is in a scenario where the high frequency noise signal is greater than the low frequency noise signal, in the expected noise control curve, a noise control amplitude corresponding to the high frequency is greater than a noise control amplitude corresponding to the low frequency.

It should be understood that the active noise control system 300 may correspond to the active noise control system in the method 200, and can implement corresponding operations of the active noise control system in the method 200, which will not be described again here for brevity.

Figure 11:
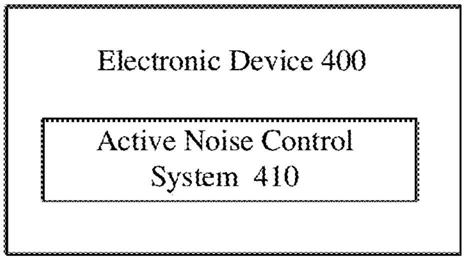
FIG. 11 is a schematic block diagram of an electronic device of an embodiment of the present application.

The embodiments of the application further provide an electronic device. As shown in FIG. 11, the electronic device 400 may include the active noise control system 410. The active noise control system may correspond to the active noise control system in the method 200, which can implement corresponding operations of the active noise control system in the method 200, which will not be described again here for brevity.

Optionally, the electronic device 400 may be an active noise control headphone. In this case, the active noise control headphone may further include a headphone case; where the active noise control system 400 is arranged in the headphone case.

Of course, the electronic device 400 may further be a portable or mobile computing devices such as smartphones, laptops, tablets and gaming devices, and other electronic devices such as automobiles, which are not limited in the embodiments of the present application.

The embodiments of the resent application further provide a chip, configured to implement the method for active noise control proposed by the above embodiments, the chip including a memory and a processor;

the memory being coupled to the processor;

the memory, configured to store a program instruction; and the processor, configured to invoke the program instruction stored in the memory, enabling the chip to execute the above method for active noise control proposed in any one of the embodiments.

The specific implementation process and beneficial effects of the chip provided in the embodiments of the present application can be referred to above, and details are not repeated here.

It should be understood that terms used in the embodiments of the present application and the claims appended hereto are merely for the purpose of describing particular embodiments, and are not intended to limit the embodiments of the present application. For example, the use of a singular form of "a", "the above" and "said" in the embodiments of the present application and the claims appended hereto are also intended to include a plural form, unless otherwise clearly indicated herein by context.

Those of ordinary skill in the art may be aware that, units of the examples described in the embodiments disclosed in this paper may be implemented by electronic hardware, computer software, or a combination of the two. To clearly illustrate interchangeability between the hardware and the software, the foregoing illustration has generally described composition and steps of the examples according to functions. Whether these functions are executed in hardware or software mode depends on a particular application and a design restrain condition of the technical solutions. Those skilled may implement the described functions by using different methods for each specific application, but this implementation should not be considered to be beyond the scope of the present disclosure.

In the several embodiments provided in the present application, it should be understood that, the disclosed system and apparatus may be implemented in other manners. For example, the described apparatus embodiment is merely an example. For example, the unit division is merely logical function division and may be other division in actual implementation. For example, a plurality of units or components may be combined or integrated into another system, or some features may be ignored or not performed. In addition, the displayed or discussed mutual coupling or direct coupling or communication connection may be indirect coupling or communication connection through some interfaces, apparatuses or units, and may also be electrical, mechanical, or connection in other forms.

The units described as separate parts may or may not be physically separate, and parts displayed as units may or may not be physical units, may be located in one position, or may be distributed on multiple network units. Part of or all of the units here may be selected according to a practical need to achieve the objectives of the solutions of the embodiments of the present application.

In addition, various functional units in the embodiments of the present application may be integrated into a processing unit, or each unit may exist alone physically, or two or more than two units may be integrated into one unit. The integrated unit may be implemented in a form of hardware, or may be implemented in a form of a software functional unit.

If the integrated unit is implemented in the form of the software functional unit and is sold or used as an independent product, it may be stored in a computer readable storage medium. Based on such understanding, the nature of the technical solutions of the present application, or the part contributing to the prior art, or all of or part of the technical solutions may be implemented in a form of software product. The computer software product is stored in a storage medium and includes several instructions for instructing a computer device (which may be a personal computer, a server, or a network device, and the like) to execute all of or part of the steps of the method described in the embodiments of the present application. The preceding storage mediums includes various mediums that can store program codes, such as, a U disk, a removable hard disk, a read-only memory (Read-Only Memory, ROM), a random access memory (Random Access Memory, RAM), a magnetic disk, an optical disk, or the like.

The foregoing descriptions are merely specific embodiments of the present application. The protection scope of the present application, however, is not limited thereto. Various equivalent modifications or replacements may be readily conceivable to any person skilled in the art within the technical scope disclosed in the present application, and such modifications or replacements shall fall within the protection scope of the present application. Therefore, the protection scope of the present application shall be subject to the protection scope of the claims.

What is claimed is:

1. A method for active noise control, comprising:

determining an expected noise control curve of performing active noise control on a target object;

determining an expected noise control weight value of active noise control, according to the expected noise control curve;

determining a reference noise weight value and an expected filter frequency response of active noise control;

determining a target filter, according to the expected noise control weight value, the reference noise weight value, the expected filter frequency response and a filter model; and performing noise control processing on an external noise signal of the target object using the target filter;

wherein the method further comprises:

determining expected residual noise energy, comprising: determining an expected residual noise energy spectrum curve; and determining the expected residual noise energy based on the expected residual noise energy spectrum curve; and the determining the target filter, according to the expected noise control weight value, the reference noise weight value, the expected filter frequency response and the filter model, comprising:

determining the target filter, according to the expected noise control weight value, the reference noise weight value, the expected filter frequency response, the expected residual noise energy and the filter model.

2. The method according to claim 1, wherein the expected noise control weight value satisfies an equation:

$$W_{NR}(Z_i) = \frac{\frac{NR(\omega_i)}{\min(NR(\omega))} + C}{1 + C}$$

wherein, $Z_i = e^{jw_it}$, $W_{NR}(Z_i)$ is the expected noise control weight value, $NR(\omega_i)$ is a noise control amplitude of the expected noise control curve at a frequency of $\omega_i$, min ($NR(\omega)$) is the minimum value of the expected noise control curve at all frequencies, and C is a constant.

3. The method according to claim 1, wherein the determining a reference noise weight value, comprising:

collecting the external noise signal;

performing a spectrum analysis on the external noise signal to obtain an amplitude spectrum of the external noise signal; and determining the reference noise weight value, according to the amplitude spectrum;

wherein the reference noise weight value satisfies an equation:

$$W_{ref}(Z_i) = P(\omega_i)$$

wherein, $W_{ref}(Z_i)$ is the reference noise weight value, and $P(\omega_i)$ is the amplitude spectrum of the external noise signal.

4. The method according to claim 1, wherein the determining an expected filter frequency response, comprising:

collecting a waveform data or a sweep frequency signal of an electroacoustic data; and determining the expected filter frequency response using the waveform data or the sweep frequency signal of the electroacoustic data.

5. The method according to claim 1, wherein the filter model satisfies an equation:

$$H(Z_i)W_{ref}(Z_i)W_{NR}(Z_i) = \frac{\sum_{k=0}^{K_1-1} Z_i^{-k} b_k}{\sum_{k=0}^{K_2-1} Z_i^{-k} a_k} W_{ref}(Z_i)W_{NR}(Z_i)$$

wherein, $Z_i = e^{jw_it}$, $H(Z_i)$ is the expected filter frequency response, $W_{ref}(Z_i)$ is the reference noise weight value, $W_{NR}(Z_i)$ is the expected noise control weight value, $b_k$ and $a_k$ are the $k^{th}$ coefficients of the target filter, $K_1$ is a molecular order of the target filter, and $K_2$ is a denominator order of the target filter.

6. The method according to claim 1, wherein an area of the maximum closed region of the expected residual noise energy spectrum curve is less than or equal to a first threshold value; or the expected residual noise energy spectrum curve is a straight line.

7. The method according to claim 1, wherein the target object is an active noise control headphone, the method further comprising:

comparing residual noise energy spectrum curves of a left headphone and a right headphone of the active noise control headphone after noise control; and if the residual noise energy spectrum curves of the left headphone and the right headphone are inconsistent, redetermining a target filter of the right headphone with residual noise of the left headphone as a target, or redetermining a target filter of the left headphone with residual noise of the right headphone as a target.

8. The method according to claim 1, wherein the filter model satisfies an equation:

$$H(Z_i)W_{ref}(Z_i)W_{NR}(Z_i) = \frac{\sum_{k=0}^{K_1-1} Z_i^{-k} b_k}{\sum_{k=0}^{K_2-1} Z_i^{-k} a_k} W_{ref}(Z_i)W_{NR}(Z_i) + NE(Z_i)$$

wherein, $Z_i = e^{jw_it}$, $H(Z_i)$ is the expected filter frequency response, $W_{ref}(Z_i)$ is the reference noise weight value, $W_{NR}$ is the expected noise control weight value, $b_k$ and $a_k$ are the $k^{th}$ coefficients of the target filter, $K_1$ is a molecular order of the target filter, $K_2$ is a denominator order of the target filter, and $NE(Z_i)$ is the expected residual noise energy.

9. The method according to claim 1, wherein the determining an expected noise control curve of performing active noise control on a target object, comprising:

determining the expected noise control curve, according to a product form of the target object and/or an application scenario of the target object;

wherein, if the target object is in a scenario where a low frequency noise signal is greater than a high frequency noise signal, in the expected noise control curve, a noise control amplitude corresponding to a low frequency is greater than a noise control amplitude corresponding to a high frequency; and if the target object is in a scenario where the high frequency noise signal is greater than the low frequency noise signal, in the expected noise control curve, a noise control amplitude corresponding to the high frequency is greater than a noise control amplitude corresponding to the low frequency.

10. An active noise control system, comprising:

a processing module, configured to determine an expected noise control curve of performing active noise control on a target object; determine an expected noise control weight value of active noise control, according to the expected noise control curve; and determine a reference noise weight value and an expected filter frequency response of active noise control;

a filter coefficient calculation module, configured to determine a target filter, according to the expected noise control weight value, the reference noise weight value, the expected filter frequency response and a filter model; and a noise control module, configured to perform noise control processing on an external noise signal of the target object using the target filter;

wherein the processing module is further configured to:

determine expected residual noise energy;

determine an expected residual noise energy spectrum curve; and determine the expected residual noise energy based on the expected residual noise energy spectrum curve;

the filter coefficient calculation module is specifically configured to:

determine the target filter, according to the expected noise control weight value, the reference noise weight value, the filter frequency response, the expected residual noise energy, and the filter model.

11. The active noise control system according to claim 10, wherein the expected noise control weight value satisfies an equation:

$$W_{NR}(Z_i) = \frac{\frac{NR(\omega_i)}{\min(NR(\omega))} + C}{1 + C}$$

wherein, $Z_i = e^{jw_it}$, $W_{NR}(Z_i)$ is the expected noise control weight value, $NR(\omega_i)$ is a noise control amplitude of the expected noise control curve at a frequency of $\omega_i$, $\min(NR(\omega))$ is the minimum value of the expected noise control curve at all frequencies, and C is a constant.

12. The active noise control system according to claim 10, further comprising:

a data collection module, configured to collect the external noise signal;

the processing module is specifically configured to:

perform a spectrum analysis on the external noise signal to obtain an amplitude spectrum of the external noise signal; and determine the reference noise weight value, according to the amplitude spectrum;

wherein the reference noise weight value satisfies an equation:

$$W_{ref}(Z_i) = P(\omega_i)$$

wherein, $W_{ref}(Z_i)$ is the reference noise weight value, and $P(\omega_i)$ is the amplitude spectrum of the external noise signal.

13. The active noise control system according to claim 10, further comprising:

a data collection module, configured to collect a waveform data or a sweep frequency signal of an electroacoustic data; and the processing module is specifically configured to:

determine the expected filter frequency response using the waveform data or the sweep frequency signal of the electroacoustic data.

14. The active noise control system according to claim 10, wherein the filter model satisfies an equation:

$$H(Z_i)W_{ref}(Z_i)W_{NR}(Z_i) = \frac{\sum_{k=0}^{K_1-1} Z_i^{-k} b_k}{\sum_{k=0}^{K_2-1} Z_i^{-k} a_k} W_{ref}(Z_i)W_{NR}(Z_i)$$

wherein, $Z_i = e^{jw_it}$, $H(Z_i)$ is the expected filter frequency response, $W_{ref}(Z_i)$ is the reference noise weight value, $W_{NR}(Z_i)$ is the expected noise control weight value, $b_k$ and $a_k$ are the $k^{th}$ coefficients of the target filter, $K_1$ a molecular order of the target filter, and $K_2$ is a denominator order of the target filter.

15. The active noise control system according to claim 10, wherein an area of the maximum closed region of the expected residual noise energy spectrum curve is less than or equal to a first threshold value; or the expected residual noise energy spectrum curve is a straight line.

16. The active noise control system according to claim 10, wherein the target object is an active noise control headphone, the processing module is further configured to:

compare residual noise energy spectrum curves of a left headphone and a right headphone of the active noise control headphone after noise control; and the filter coefficient calculation module is further configured to:

if the residual noise energy spectrum curves of the left headphone and the right headphone are inconsistent, redetermine a target filter of the right headphone with residual noise of the left headphone as a target, or redetermine a target filter of the left headphone with residual noise of the right headphone as a target.

17. The active noise control system according to claim 10, wherein the filter model satisfies an equation:

$$H(Z_i)W_{ref}(Z_i)W_{NR}(Z_i) = \frac{\sum_{k=0}^{K_1-1} Z_i^{-k} b_k}{\sum_{k=0}^{K_2-1} Z_i^{-k} a_k} W_{ref}(Z_i)W_{NR}(Z_i) + NE(Z_i)$$

wherein, $Z_i = e^{jw_it}$, $H(Z_i)$ is the expected filter frequency response, $W_{ref}(Z_i)$ is the reference noise weight value, $W_{NR}(Z_i)$ is the expected noise control weight value, $b_k$ and $a_k$ are the $k^{th}$ coefficients of the target filter, $K_1$ is a molecular order of the target filter, $K_2$ is a denominator order of the target filter, and NE $(Z_i)$ is the expected residual noise energy.

18. The active noise control system according to claim 10, wherein the processing module is specifically configured to:

determine the expected noise control curve according to a product form of the target object and/or an application scenario of the target object;

wherein, if the target object is in a scenario where a low frequency noise signal is greater than a high frequency noise signal, in the expected noise control curve, a noise control amplitude corresponding to a low frequency is greater than a noise control amplitude corresponding to a high frequency; and if the target object is in a scenario where the high frequency noise signal is greater than the low frequency noise signal, in the expected noise control curve, a noise control amplitude corresponding to the high frequency is greater than a noise control amplitude corresponding to the low frequency.

* * * * *